(12) United States Patent
Shachar et al.

(10) Patent No.: US 12,423,424 B2
(45) Date of Patent: Sep. 23, 2025

(54) ANALYZING FILE ENTROPY TO IDENTIFY ADVERSE CONDITIONS

(71) Applicant: Dell Products L.P., Round Rock, TX (US)

(72) Inventors: Tomer Shachar, Omer (IL); Maxim Balin, Gan—Yavne (IL); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 392 days.

(21) Appl. No.: 17/970,457

(22) Filed: Oct. 20, 2022

(65) Prior Publication Data

US 2024/0134976 A1    Apr. 25, 2024
US 2024/0232347 A9    Jul. 11, 2024

(51) Int. Cl.
*G06F 21/56*     (2013.01)
*G06F 16/176*    (2019.01)

(52) U.S. Cl.
CPC .......... *G06F 21/565* (2013.01); *G06F 16/176* (2019.01); *G06F 2221/034* (2013.01)

(58) Field of Classification Search
CPC ..................................................... G06F 21/565
See application file for complete search history.

(56) References Cited

U.S. PATENT DOCUMENTS

| | | | |
|---|---|---|---|
| 10,229,269 B1 * | 3/2019 | Patton | G06F 21/554 |
| 2020/0067975 A1 * | 2/2020 | Ojha | G06F 21/577 |

* cited by examiner

*Primary Examiner* — Simon P Kanaan
(74) *Attorney, Agent, or Firm* — Amin, Turocy & Watson, LLP

(57) ABSTRACT

A network connected storage device detects unusual file-sharing-command activity based on a baseline file-sharing-command signature and analyzes files stored on the storage with respect to a parameter, such as entropy, to determine whether ransomware may have infiltrated the storage device, or a storage associated therewith. Applying by the storage device a function to an entropy value corresponding to a second portion of a file may result in a determination that an analyzed entropy corresponding to the second portion may have been partially encrypted by ransomware. The analyzed entropy corresponding to the second file portion may be compared to an entropy of a first file portion. The first file portion may be a different portion of the same file as the second portion or may be the same portion of the same file that resulted from analysis before the triggering event.

20 Claims, 11 Drawing Sheets

A method, comprising: analyzing, by a data storage device that manages a storage on behalf of a computing system, a first portion of at least one file stored in the storage with respect to a file parameter, the analyzing of the first portion resulting in a first analyzed file portion and a first analyzed parameter value

805 responsive to a triggering event indication that indicates a triggering event: analyzing, by the data storage device, a second portion of the at least one file stored in the storage with respect to the file parameter, the analyzing of the second portion resulting in a second analyzed file portion and a second analyzed parameter value

810 determining, by the data storage device, that the second analyzed parameter value exceeds the first analyzed parameter value

815 responsive to the determining that the second analyzed parameter value exceeds the first analyzed parameter value, performing, by the data storage device, a remediation action

820 generating a file sharing signature corresponding to the at least one file stored in the storage of the computing system

825 monitoring, by the data storage device, at least one file sharing command directed to the at least one file stored in the storage

830 determining, by the data storage device, a file sharing activity metric corresponding to the at least one file sharing command

835 determining, by the data storage device, that the file sharing activity metric does not match the file sharing signature

840 generating, by the data storage device, the triggering event indication based on the file sharing activity metric being determined not to match the file sharing signature

845

ANALYZING FILE ENTROPY TO IDENTIFY ADVERSE CONDITIONS

BACKGROUND

A computing network that is accessible to a remote (geographically or logically) computing device, or other network, via yet another network such as a communication network, may be referred to as a cloud, or a cloud network. A cloud may facilitate remote storage of files. Furthermore, files may be stored at a cloud data store, such as one or more hard drives, magnetic disk drives, solid state drives, and the like, which cloud-connected, or network-connected, data store may be referred to as a storage, a cloud storage, or a network-connected storage.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method comprises analyzing, by a data storage device that manages a storage on behalf of a computing system, a first portion of at least one file stored in the storage with respect to a file parameter, the analyzing of the first portion resulting in a first analyzed file portion and a first analyzed parameter value. Responsive to a triggering event indication that indicates a triggering event the method may comprise analyzing, by the data storage device, a second portion of the at least one file stored in the storage with respect to the file parameter, the analyzing of the second portion resulting in a second analyzed file portion and a second analyzed parameter value; determining, by the data storage device, that the second analyzed parameter value exceeds the first analyzed parameter value, or satisfies a defined function with respect to the first analyzed parameter value; and responsive to the determining that the second analyzed parameter value exceeds the first analyzed parameter value, or satisfies a defined function with respect to the first analyzed parameter value, performing, by the data storage device, a remediation action or a mitigation action to mitigate an effect associated with the triggering event. A mitigation action may comprise restricting access to the set of files stored via the storage by a second computing system corresponding to the file sharing activity metric. The file parameter may comprise entropy and may correspond to entropy of a file or entropy of just a portion of a file.

The example embodiment method may further comprise dividing, by the data storage device, the second analyzed parameter value by the first analyzed parameter value to result in a parameter value ratio, wherein the determining that the second analyzed parameter value exceeds the first analyzed parameter value comprises determining that the parameter value ratio exceeds a threshold ratio specified by a configured attack criterion. The threshold ratio specified by the configured attack criterion may be a ratio of one to one. The threshold ration may be a determined based on an allowable change of entropy caused by normal use of a file, or files, stored on the storage.

The example embodiment may further comprise generating a file sharing signature corresponding to the at least one file stored in the storage of the computing system; monitoring, by the data storage device, at least one file sharing command directed to the at least one file stored in the storage; determining, by the data storage device, a file sharing activity metric corresponding to the at least one file sharing command; determining, by the data storage device, that the file sharing activity metric does not match the file sharing signature; and generating, by the data storage device, the triggering event indication based on the file sharing activity metric being determined not to match the file sharing signature. The file sharing signature may comprise an indication of a number of file sharing commands directed to, or performed by, the storage device of the first computing system relative during a baseline period. The file sharing signature may be updated based on previous iterations of the file sharing activity metric being analyzed with respect to the file sharing signature and entropy determinations corresponding to a triggering indication corresponding the previous iterations of the analysis, which updating may be performed by applying the previous triggering indications, corresponding entropy determinations, and corresponding analysis to an artificial intelligence learning model.

The file sharing signature may comprise first information representative of a baseline number of executions of the at least one file sharing command performed with respect to the at least one file during a baseline period, wherein the file sharing activity metric comprises second information representative of a monitored number of executions of the at least one file sharing command performed with respect to the at least one file during a monitoring period, and wherein the determining that the file sharing activity metric does not match the file sharing signature comprises determining that the monitored number of executions of the at least one file sharing command exceeds, by a threshold value specified by a configured file sharing activity criterion, the baseline number of executions.

The file sharing signature may comprise a baseline number of executions of a file sharing command performed with respect to the at least one file during a baseline period, wherein the file sharing activity metric comprises a monitored number of executions of the file sharing command performed with respect to the at least one file during a monitoring period, wherein the second defined function is defined according to a configured file sharing activity criterion, and wherein the file sharing activity metric being determined not to satisfy the second defined function with respect to the file sharing signature comprises determining that the monitored number of executions does not satisfy the second defined function with respect to the baseline number of executions.

The second portion of the at least one file stored in the storage may be the same portion of the at least one file as the first portion of the at least one file stored in the data storage device, wherein the analyzing of the first portion of the at least one file stored in the data storage device may comprise analyzing the first portion before the triggering event, and wherein the analyzing of the second portion of the at least one file stored in the data storage device may comprise analyzing the second portion after the triggering event. The second portion of the at least one file stored in the storage may be a different portion of the at least one file than the first portion of the at least one file stored in the data storage device, wherein the analyzing of the first portion of the at least one file stored in the data storage device may comprise analyzing the first portion and the second portion after the triggering event and determining that an entropy of the second portion exceeds an entropy of the first portion.

The second portion of the at least one file stored in the data storage device or the first portion of the at least one file stored on the data storage device may comprise less than all of the at least one file.

The computing system may comprise a first computing system, and the remediation action may comprise generating a notification that identifies a second computing system corresponding to the file sharing activity metric.

The example method may further comprise blocking, by the data storage device, access by the second computing system to the first computing system.

BRIEF DESCRIPTION OF THE DRAWINGS

FIG. 8 illustrates an exemplary embodiment method to detect and mitigate ransomware in a cloud environment.

DETAILED DESCRIPTION OF THE DRAWINGS

Figure 1:
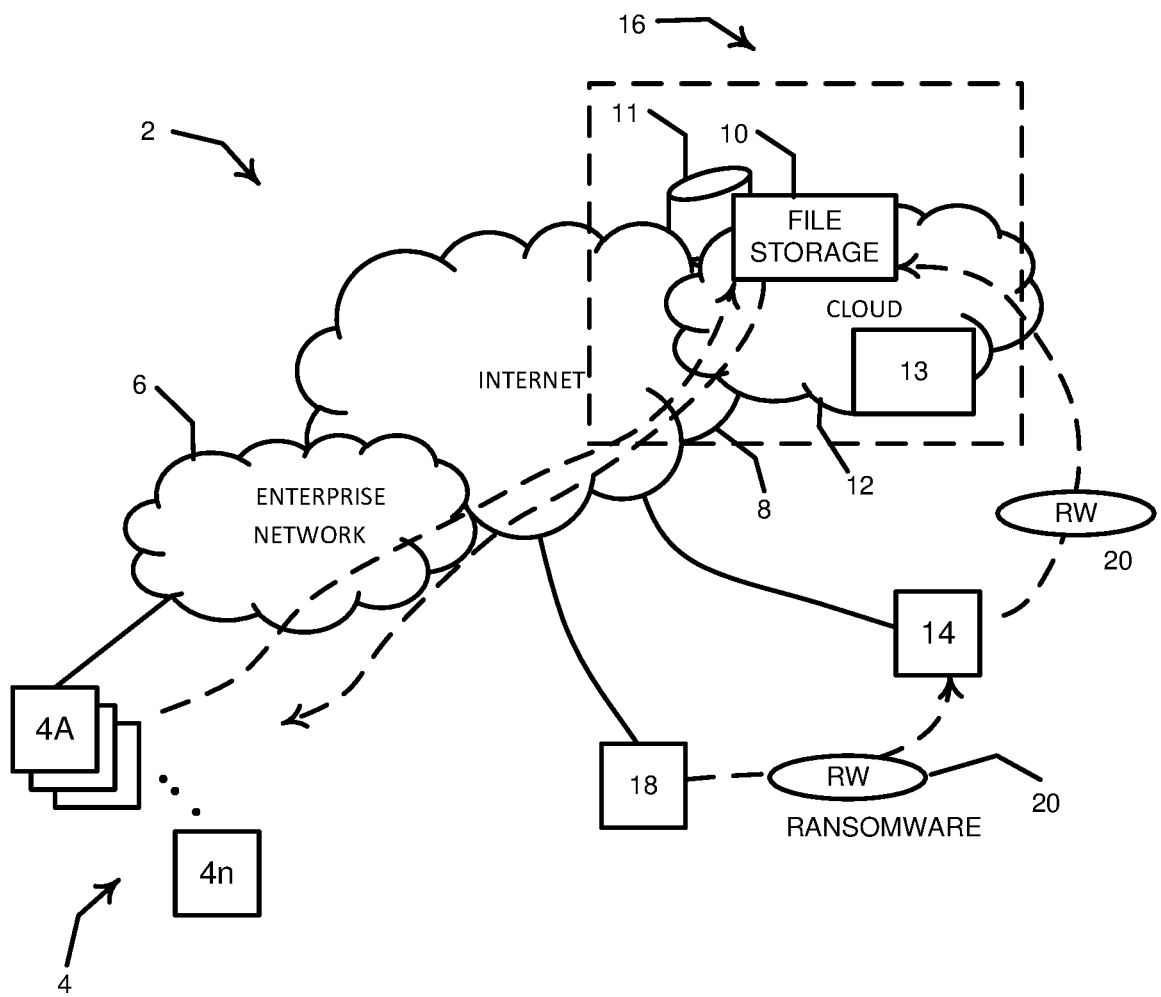
FIG. 1 illustrates a schematic of network cloud synchronizing system.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is only illustrative and exemplary of one or more concepts expressed by the various embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Cryptographic ransomware is a type of computing system malware that locks access to users' files by encrypting the files and demanding a ransom to obtain a decryption key to decrypt and recover the 'ransomed' files. New types of ransomware attacks perform fast and efficient damage/encryption by encrypting only part of a file. This type of malware has become a serious challenge for enterprises. In cases where regular/legitimate/authorized users' infected computer has access to documents in a network shared volume (e.g., that may use SMB file sharing commands), a single user's infected computer or file stored on a network connected shared storage can quickly cause 'infection' of an enterprise's documents with ransomware that denies access to the enterprises files. Using partial encryption for ransomware speeds up the encryption process and may be difficult to detect using conventional ransomware detection techniques. One reason that ransomware that only partially encrypts a file is difficult to detect is that partial encryption by ransomware leaves a file, such as a text document, partially readable and may statistically look like an unencrypted version. Thus, ransomware that uses partial encryption results in effective ransomware like conventional ransomware, but an 'infection' may 'spread' more quickly than if conventional full-file encryption is used by the ransomware.

Turning now to FIG. 1, the figure illustrates cloud network environment 2. In cloud network environment 2, endpoints 4, such as user devices, may be endpoints of an enterprise network 6, or endpoints 4 may represent, or correspond to, enterprise users, such as employees. Endpoints 4 may correspond to users that are not part of an enterprise, but may have access to cloud storage via communication network 8, such as the Internet. Endpoints 4A-4n, or devices corresponding thereto, may store files from enterprise network 6 via communication network 8, e.g., a public communication network, with a cloud file storage device 10 that manages a network connected storage 11 (e.g., the storage is accessible via network 8. Storage device 10, such as a cloud file storage device, may comprise a processor that is configured to manage storage 11, which may comprise, for example, a hard disc drive, a solid-state drive, a flash drive, a floppy disc drive, a tape drive, and the like. Storage device 10 may be part of, operated by, or offered by a network cloud 12 of a cloud service provider. Network cloud 12 may comprise cloud service 13. Cloud service 13, which may be referred to as a cloud storage service, may comprise an artificial intelligence component, process, service, or other computing resource that may be part of, may interact with, may interoperate with, may coordinate with, or may cooperate with storage device 10, or may otherwise facilitate file storage, sharing, or synchronizing of files stored on file storage 11. Remote endpoint 14, which may correspond to a user device, such as a laptop computer, a smartphone, a tablet, or similar, may be coupled to public communication network 8 and may obtain, share, attempt to share, access, attempt to access, or facilitate synchronizing of files that may be stored on cloud file storage 11. Cloud file storage device 10, storage 11, or service 13 may be part of a first computing system 16.

Attack device 18, e.g., an attack computer, which may be coupled with public network 8 via endpoint 14, may transmit a ransomware message 20, which may comprise a file, a program, a script, data, code, malware, or other form of computer instruction or data, via endpoint 14, to storage device 10, or to storage 11, via the public network for nefarious purposes. Ransomware message 20 may infect one or more files, or other storage units, stored on storage 11 or locally on a device at endpoint 4. (Although a single endpoint 4 is described for brevity, it will be appreciated that reference to endpoint 4 may be a reference to one or more endpoints 4A-4n.) A ransomware infection may comprise encrypting a file, or other storage unit, such that a user of a device corresponding to endpoint 4 cannot access the file or other storage unit without a decryption key, and as a result of which a user of attack device 18 typically will demand a ransom in order to re-enable access for the user of the device corresponding to endpoint 4. Moreover, a ransomware infection, or ransomware attack, may comprise only partially encrypting a file, or other storage unit, such that the user of the device corresponding to endpoint 14 cannot access the file or other storage unit without a decryption key, for which the user of attack device 18 typically will also typically demand a ransom. Only encrypting a portion of a file (e.g., partial encryption of the file) may be desirable to an attacker, or attacking software, because a file can be partially encrypted faster than the entire file can be encrypted. Encrypting a file, or a portion of a file, tends to increase the entropy, or degree of uncertainty, of data in the file, or data in the portion of the file. Thus, by encrypting, or by applying another type of cryptographic function such as a hash process, to a given portion of a file, the density, or the number of bytes used to represent the now (as a result of the cryptographic process or function) more uncertain portion of the given file will likely be higher than the density, or the number of bytes of the given file from before the cryptographic process or function was applied.

A mitigation action or remediation action may comprise halting activity that corresponds to a file or other storage unit having a high entropy, blocking access to a computing system, or an endpoint, corresponding to another computing system that may correspond to file access/sharing commands exceeding a baseline file activity signature, removing an endpoint from permission to share or sync files with a cloud storage, or performing analysis. In an embodiment, if cloud storage service 13 determines that a storage unit at cloud storage 11 may have been compromised by a ransomware attack, cloud storage device 10 may revert the storage unit to a previous version of the storage unit that corresponds to a normal, or baseline, file activity signature that corresponds to known normal file sharing activity relative to the storage unit. A previous version to which the storage unit reverts may be a version stored at cloud storage 11 or at a device associated with an endpoint that has permission to share and sync files with the cloud storage or with devices associated with other endpoints. A file sharing signature may comprise information corresponding to file usage, file access, file change, file update, file location, and other activity associated with use of one or more files stored on the storage 11 by authorized users of the storage.

Figure 2A:
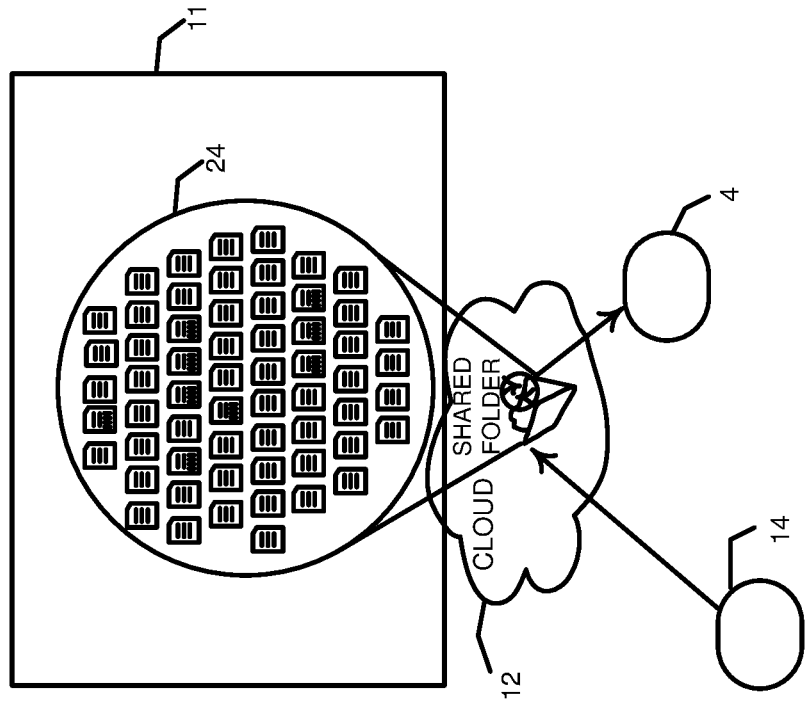
FIG. 2A illustrates a network-connected storage file sharing environment.

Turning to FIG. 2A, the figure further illustrates cloud storage file storing, sharing, and synchronization environment 2 as described above in reference to FIG. 1. In FIG. 2A, a folder 24 is shown comprising sixty files that are stored in cloud storage 11. Files in folder 24 may be accessible by computing devices associated with endpoints 4 or 14. In the figure, files in folder 24 are shown by icons having three horizontal lines that represent that the respective files have not been encrypted by ransomware. Ransomware message 20 is shown as having been loaded into, or via, network-connected storage device 10 associated with network-connected storage 11. Ransomware message 20 may have been loaded into storage device 10 via file sharing commands, such as, for example, server message block ("SMB") commands. After ransomware message 20 has loaded into storage device 10 or onto storage 11, the ransomware may perform a partial encryption of one or more files in shared folder 24.

Figure 2B:
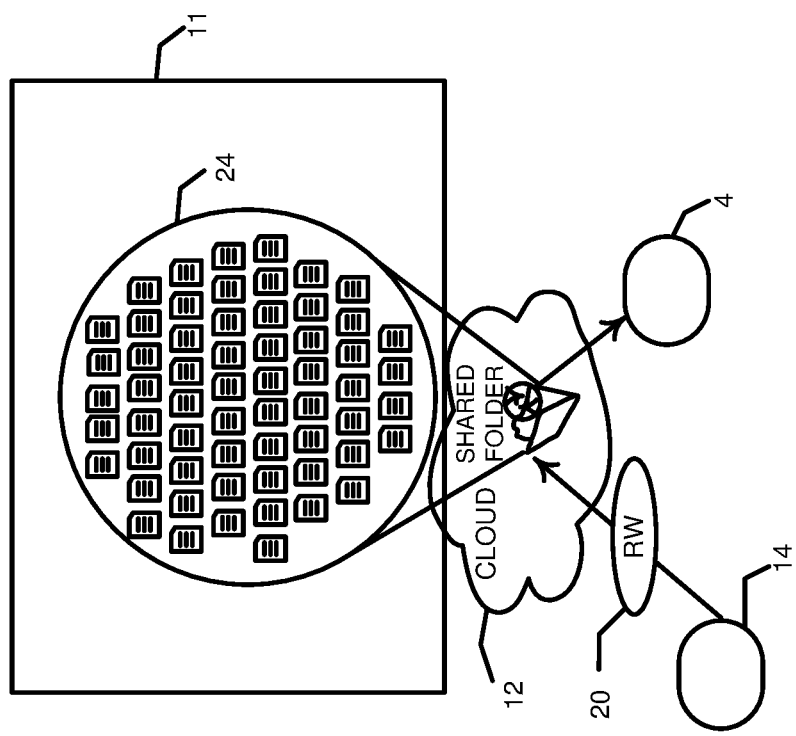
FIG. 2B illustrates a network-connected storage file sharing environment with shared files maliciously encrypted.

FIG. 2B shows environment 2 as described in reference to 2A but with nine files stored on storage 11 having been partially encrypted. Partially encrypted files in folder 24 are shown as icons that have two horizontal lines and three vertical lines, with the three vertical lines representing a portion of a file that has been encrypted by ransomware 20 and the two horizontal lines, shown as less dense or farther apart than the vertical lines, representing a portion, or portions, of the files unencrypted by ransomware 20. Storage device 10, or cloud service 13, may determine, responsive to a triggering event, that out of 60 files of folder 24 that may have been unencrypted during a baseline period, nine files comprise a portion that has been encrypted, each exhibiting a portion that is denser, or has more entropy, than the corresponding portion of the files as they existed before the triggering event. A triggering event may comprise a determination by storage device 10 that more file sharing commands were processed corresponding to a set of one or more files, that a manual request from an authorized security personnel has been received to perform an entropy determination by storage device 10 of files stored on storage 11 services by the storage device, or that a time for a scheduled entropy determining act has been reached.

A baseline file sharing signature, corresponding to routine, typical, or otherwise routine file sharing activity by known, authorized users of the set of one or more files of storage device 10, or of storage 11, may be determined during the baseline period. As shown in FIG. 2B, nine files are shown having been partially encrypted, and storage device 10 may restrict access to files in shared folder 24 after a triggering event has been indicated as having occurred. The triggering event may comprise determining that a number of file sharing commands, such as SMB2 commands, has exceeded a number of commands associated with the same files as specified in the baseline file sharing command signature that may have been determined during the baseline period. Access by a computing system corresponding to an endpoint (e.g., endpoint 14), which storage device 10 or cloud storage service 13 may have identified as being associated with file sharing activity that corresponds to a defined function that may be defined according to a configured file sharing activity criterion to files in shared folder 24, may be blocked, restricted, or identified in an alert or in a report to a computing system security personnel of an enterprise, such as an enterprise that operates network 6, among other potential mitigation or remediation actions.

Figure 3A:
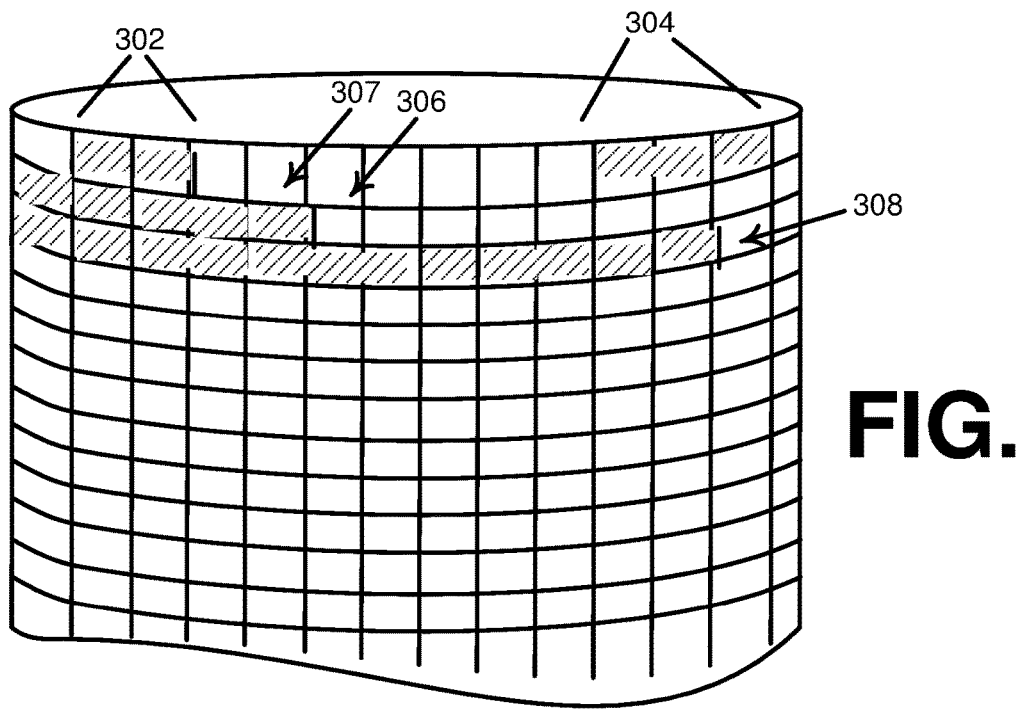
FIG. 3A illustrates a network-connected storage with files stored thereon.
Figure 3B:
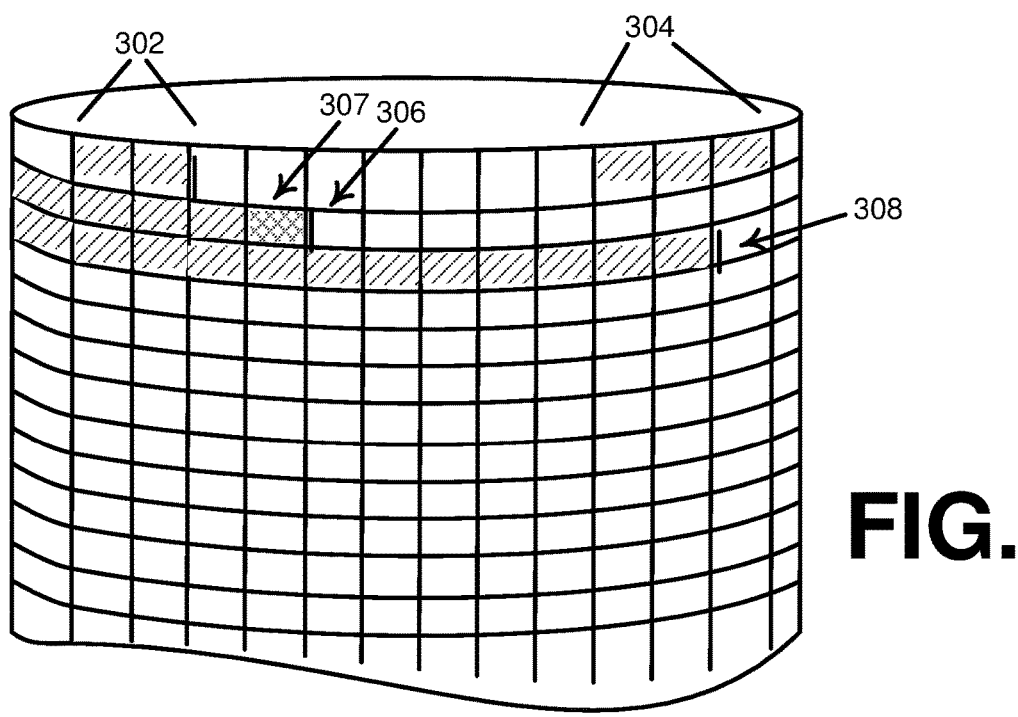
FIG. 3B illustrates a network-connected storage with files that have been partially encrypted.

Turning now to FIG. 3A, the figure illustrates a volume 30 that contains files 302 and 304 in the first row, file 306 in the second row, and file 308 in the third row. Storage blocks that store the files are illustrated bounded by thick black lines. Respective data of the files are shown as storage blocks shaded with diagonal lines In FIG. 3B, file 306 is shown with a storage block of first portion 307 shaded with cross hatching to indicate that the first portion has been encrypted and is more data-dense due to encryption from a ransomware attack. Thus, in the example shown in FIGS. 3A and 3B, storing of file 306 is shown spread among the same blocks and the same number of blocks, but has a higher density of bytes used to store first portion 307 in FIG. 3B than the same block shown in FIG. 3A. A monitoring and detecting module that may be part of storage device 10, and running on a processor thereof, may detect that the byte-density, or data-density, of first portion 307 is higher in the version of the file shown in FIG. 3B as compared to the illustration of the version of the same file shown in FIG. 3A.

Figure 4A:
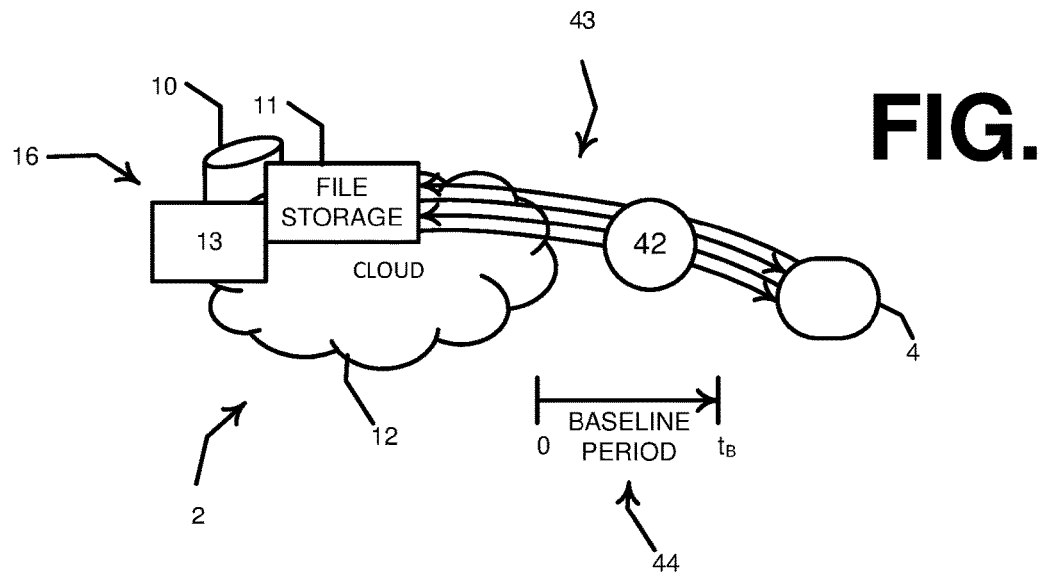
FIG. 4A illustrates a network-connected storage system during a baseline period during which a file sharing signature is determined.

Turning now to FIG. 4A, the figure illustrates cloud network environment (or system) 2 with a file sharing signature 42, which may be referred to as a baseline file sharing profile and which may be generated by storage device 10, corresponding to at least one file stored in the storage 11 of computing system 16, which may be referred to as a first computing system. File sharing signature 42 may be generated by storage device 10 based on commands 43, such as file sharing commands, which may comprise SMB or SMB2 commands, or other types of SMB commands, for example. Commands 43 may be monitored during a baseline period 44 to determine a typical, normal, or routine number of file sharing commands processed relative to the at least one file accessed by one or more devices corresponding to endpoint 4 (endpoint 4 may comprise multiple endpoints 4A . . . 4n as shown in FIG. 1) that corresponds to enterprise network 6. Commands 43 are shown in FIG. 4A as two pairs of corresponding back-and-forth messages between endpoint 4 and storage device 10. However, it will be appreciated that commands 43 may not comprise an equal number of commands from endpoint 4 to storage device 10 as from storage device 10 to endpoint 4. Endpoint 4 may represent legitimate users of storage 11, for example employees of enterprise network 6 shown in FIG. 1, that have been granted access to the storage. Generating a file sharing signature 42 based on a baseline of legitimate file usage, file access, file change, file update, file location, etc., may facilitate reducing false positives in determining file sharing command access of storage 11 as indicating a triggering event that may correspond to a ransomware attack.

Examples of file sharing commands 43, occurrences of which may be used in generating a file sharing signature 42, may comprise: SMB2 TREE_CONNECT, SMB2 CREATE, SMB2 READ, SMB2 WRITE, SMB2 REMOVE, SMB2 QUERY_INFO, or SMB2 OPLOCK_BREAK. A number of total occurrences of commands 43 logged, noted, identified, or otherwise detected or recorded, during baseline period 44 be used as the file sharing signature. File sharing profile 42A may comprise an indication of a number of occurrences of one or more particular individual commands 43. A pattern of occurrences of one or more commands 43 may be used as file sharing profile 42. File sharing signature 42 is intended to reflect normal usage of storage 11 by a legitimate user corresponding to endpoint 4 during a determined baseline period 44, which period may be selected, chosen, calculated, or otherwise generated to correspond to a transaction, or transactions, of file sharing by a legitimate user, such as an employee authorized to use network 6, of file storage 11 during a normal workday of the user, for example.

Commands 43 selected for use in generating file sharing signature 42 may be selected based on a prediction, or likelihood, that a potential attacker may use the selected commands to partially encrypt files. For example, a QUERY_INFO command may be used to request information regarding a file to determine the file's type if, for example, only files having a type such as .doc or .pdf will be encrypted by an attacker's ransomware. In another example, to facilitate encrypting a file, including partially encrypting a file, an OPLOCK_BREAK command could be used by an attack to close open connections to the file even if the file is currently in use by a legitimate user of the file or storage 11. If normal use during baseline period 44 does not comprise a command 43 being an OPLOCK_BREAK command, the file sharing signature may comprise an indication of no-normal-use, or may lack an indication of normal use, of the OPLOCK_BREAK command and thus a defined function that comprises a comparing of a number of occurrences during a later-monitored period of file sharing commands with a criterion, for example a threshold of a number of uses of the OPLOCK_BREAK command being zero, may result in an indication of possible ransomware attack (e.g., the detection during a later monitoring period of instances of the use of a OPLOCK_BREAK file sharing command that is greater than zero may be deemed a triggering event). Similarly, if, during baseline period 44, a legitimate user connected to storage 11 via endpoint 4 only performs one SMB2 READ command and one corresponding SMB2 WRITE command, the file sharing signature 42 may comprise a number of SMB2 READ commands being one and a number of SMB2 WRITE commands being one.

Figure 4B:
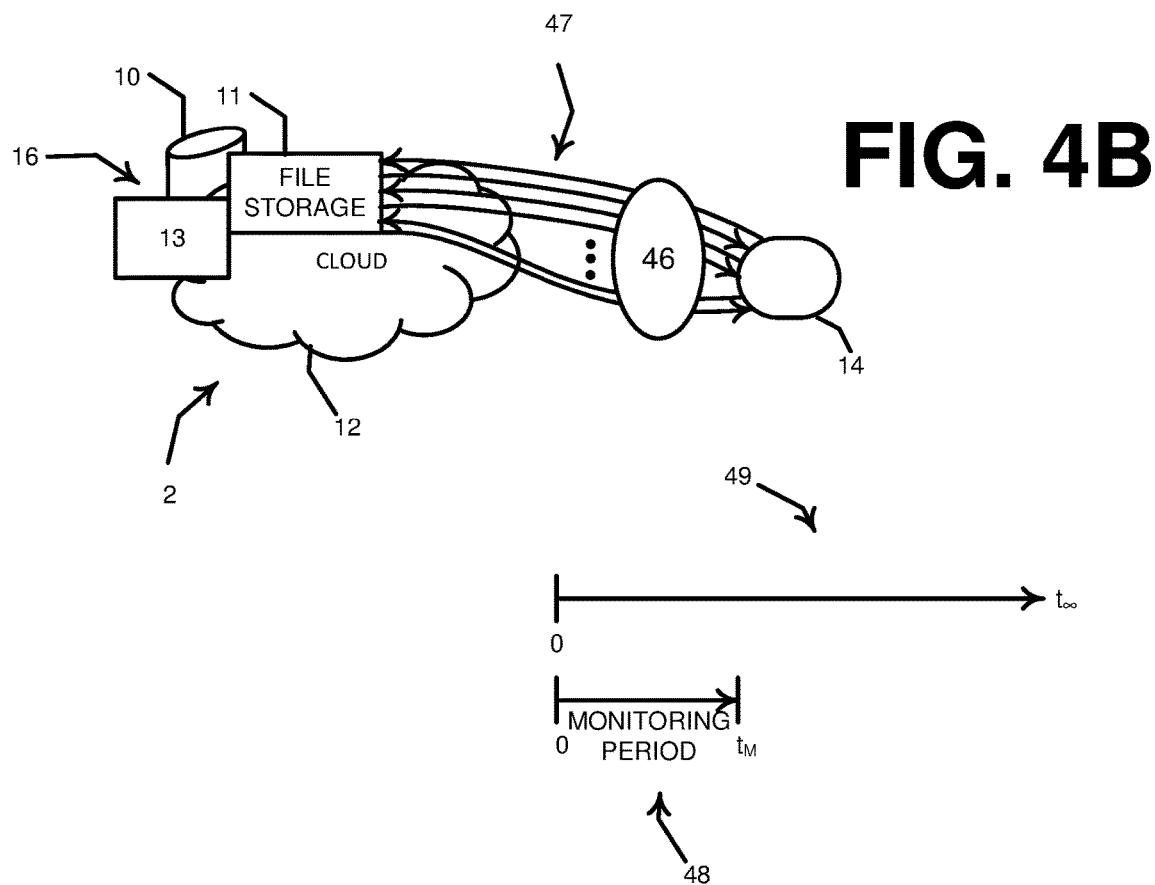
FIG. 4B illustrates a network-connected storage system during a monitoring period during which a potential ransomware attack is detected.

Turning now to FIG. 4B, the figure illustrates cloud network environment (or system) 2 comprising data storage device 10, which may determine file sharing activity metric 46 by monitoring file sharing commands 47 from endpoint 14 (instead of endpoint 4 as described in reference to FIG. 4A) during monitoring period 48. Monitoring period 48 may be the same amount of time, or approximately the same amount of time, as baseline period 44 described in reference to FIG. 4A. In FIG. 4B, monitoring period 48 may be a sliding or moving continually monitored period, or window, that is ongoing as indicated by continual period 49 shown as lasting an infinite amount of time. File sharing activity metric 46 may comprise a number of times a given file sharing command, or commands, 47, is/are received by, transmitted by, or otherwise performed by, storage device 10. Commands 47 may be one or more of the same command, or commands, used to generate file sharing signature 42 described in reference to FIG. 4A. In the example shown in FIG. 4B, more than six back-and-forth commands 47 are shown as compared to four commands 43 shown during baseline period 44 described in reference to FIG. 4A. Thus, in the examples shown in FIG. 4A and FIG. 4B, if a file sharing signature 42 determined during baseline period indicates four total file sharing command transaction 43 performed during baseline period 44, and, for example, file sharing activity metric 46 indicates ten file sharing commands 47 monitored during monitoring period 48, storage device 10 may determine that a triggering even has occurred because more file sharing commands 47 occurred during monitoring period 48 than the number of file sharing commands 43 that occurred during baseline period 44. Such a mismatch between a number of file sharing commands indicated in file sharing signature 42 and a number of file sharing commands indicated in file sharing activity metric 46 may be referred to as the file sharing activity metric not matching the file sharing signature.

It will be appreciated that another criterion, or criteria, other than just determining that file sharing command metric 46 comprises an indication of more file sharing commands than a number of file sharing commands indicated in the file sharing signature, may be used in comparing file sharing activity metric 46 to file sharing signature 42 to determine whether a triggering event may have occurred that warrants further investigation by storage device 10 of one or more files stored on storage 11. For example, a file sharing activity metric 46 corresponding to a pattern of certain commands (which may be referred to as a pattern criteria), even if a number of commands is not numerous, could be deemed as a triggering event. For example, if three commands, OPLOCK_BREAK command followed by an SMB READ and an SMB WRITE command are received by storage device 10, even though fewer in number than a number of commands (e.g., four as shown in FIG. 4A), a determination of a triggering event may be made. Another pattern of file commands of file sharing activity metric 46 that could be deemed as not matching file sharing signature 42 may be multiple SMB_WRITE commands directed to storage 11 at a higher frequency than SMB-WRITE commands may have been processed by storage device 10 during baseline period 44. Furthermore, it will be appreciated that storage device 10 may implement an artificial intelligence process to refine a criterion or criteria, to determine whether file sharing activity metric 46 matches file sharing signature 42 based on previous iterations of comparing of a determined file sharing activity metric 46 to a file sharing signature 42. Another criterion or pattern that may be used to determine whether a file sharing activity metric 46 matches file sharing signature 42 may be, for example, a determined number of SMB_TREE_CONNECT commands following SMB_READ, SMB_WRITE and SMB_REMOVE commands. In another example, detection of a number of connection requests exceeding a determined connection request criterion following a set of Read/Write commands may be deemed as indicative of suspicions activity, and thus may be deemed as a triggering event.

Upon determining that a triggering event has occurred, storage device 10 may analyze one or more files stored on storage 11 to determine whether a portion of one or more of the files has changed with respect to a file parameter and whether the change satisfies a defined function. For example, the file parameter analyzed may comprise entropy. Storage device 10 may determine that an entropy of a file has changed relative to the entropy of the same file that may have been measured before the triggering event occurred. Storage device 10 may merely determine that an entropy of the file has exceeded a predetermined, or a preset, entropy regardless of what the file's entropy was before the triggering event. Storage device 10 may determine an entropy of a portion of a file relative to a portion of the file before occurrence of the triggering event. The portion analyzed after the triggering event may be referred to as a second portion of the file which second portion may be compared to the same portion analyzed before the triggering even, which portion of the earlier-analyzed file may be referred to as a first portion even though the terms 'first portion' and 'second portion' may refer to the same portion of a given file being analyzed.

Based on analysis of commands 47 monitored during monitoring period 48, storage device 10 may determine or identify files that were accessed during the monitoring period and inspect files stored on storage 11 for partial encryption in the accessed files. Based on detection of a high entropy, e.g., with reference to an entropy threshold being exceeded or defined high entropy function being satisfied, or a high data density, e.g., with reference to a data density threshold being exceeded or defined high data density function being satisfied, in a portion of a file, the storage device 10 may deem the file as having been attacked and may block access to a computing system, which may be referred to as a second computing system, that may have sent commands 47 that resulted in the partial encrypting of one or more files stored on storage 11. An entropy determining model running on storage device 10 may facilitate detection of partially encrypted files.

Entropy may be viewed as a measure of randomness of data of a given file and may be used to determine whether a file contains encryption. A degree of randomness, which may correspond to an entropy score, may be measured. In one non-limiting embodiment, an entropy score may range from, for example, a number 0, meaning not random, to 10, meaning total randomness. A high score, above an entropy threshold for example, may indicate that a file having the high randomness score may include encryption. Using an entropy metric to analyze a file, or a portion of a file, may facilitate determining that a file has been encrypted. Analysis of a portion of a file having a high entropy score may be compared to analysis of the corresponding portion of the same file before encryption is suspected to have occurred to determine that the analyzed portions of different versions of the same file have different data density values (e.g., different entropy scores). If analysis of a portion of a file indicates that the portion has a higher data density after a potential encryption may have occurred, as indicated by a triggering event indication for example, than before the potential encryption may have occurred, an indication that the file has been subjected to a ransomware attack may be generated.

Figure 5:
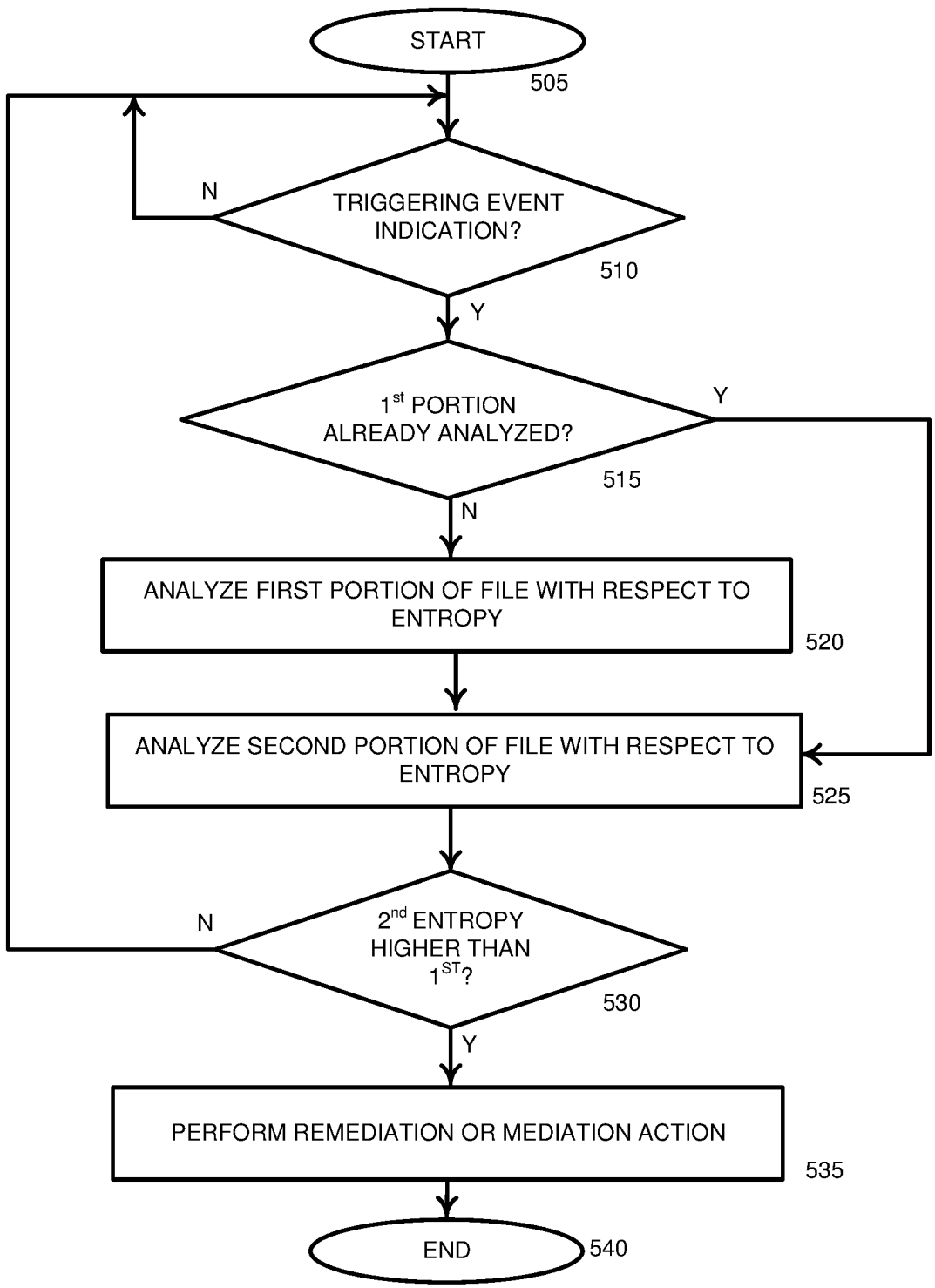
FIG. 5. Illustrates a flow diagram of an embodiment to establish a baseline file sharing signature.

After cloud storage device 10, or storage service 13, as shown in FIG. 1, determines that a ransomware attack may have infected, or affected, a storage unit stored at cloud storage 11, the cloud storage device or service may lock edit permission for a device corresponding to an endpoint from which the ransomware attack originated, such as endpoint 14, and may notify the owner of the cloud shared storage (e.g., notify IT personnel associated with enterprise network 6, or IT personnel of an operator of the cloud storage) about the locking of the ransomware origination endpoint. The owner of the cloud shared storage 10 may permit cloud storage service 13 to revert a storage unit, or units, encrypted by the ransomware attack to a previous version of the storage unit(s Turning now to FIG. 5, the figure illustrates a flow diagram of an embodiment method 500 to detect and remediate or mitigate a ransomware attack in a cloud environment. Method 500 begins at act 505. At act 510, a service running in a cloud computing network that comprises a cloud storage and associated cloud storage device comprising a processor and that may be separate from another network, for example an enterprise's computing network, to which a plurality of user computing device may have connectivity, at least for purposes of sharing or synchronizing files, monitors activity related to the storage. The service may comprise an artificial intelligence service. Method 500 may be carried out, executed, or otherwise performed by a processor of a network connected storage device of a first computing system associated with the network connected storage. Examples of activity monitored at act 510 may comprise determining that a triggering event indication has been received at the storage device At act 510, a triggering event indication may be detected. A triggering event indication may comprise receiving a manual instruction to determine whether a network connected storage has been infected with a ransomware attack a triggering event indication may comprise receiving a scheduled instruction to determine whether the network connected storage has been infected with a ransomware attack. In an embodiment, a triggering event indication may be result from an automatic detection by a network connected storage device of file sharing commands directed to the network connected storage by a second computing system, which may be communicatively coupled with the network connected storage via a communication network, wherein the automatically detected file sharing commands do not match a file sharing signature, as described in reference to FIG. 6. Continuing with description of FIG. 5, if a determination is made at act 510 that an indication of a triggering event has not been received method 500 returns to act 510 and continues monitoring for a triggering event indication.

If, however, a determination is made at act 510 that a triggering event indication has been received, method 500 advances to act 515. At act 515, a determination is made whether a first portion of a file of a network connected storage has already been analyzed. If a determination is made at act 515 that an analysis of a first portion of a file has not been performed method 500 advances to act 520. At act 520, the first portion of the file may be analyzed with respect to a parameter, for example entropy, and method 500 advances to act 525. If a determination is made at act 515 that a first portion of a file has already been analyzed method 500 advances from act 515 to act 525. At act 525, a second portion of the file may be analyzed with respect to a parameter, for example entropy, and method 500 advances to act 530. Analysis at acts 520 or 525 may comprise analyzing more than one file and more than one portion of a file may be analyzed. A determination of entropy may be made on a per-file basis before portions of a given file are analyzed with respect to entropy, or a determined portion, or portions, of files may be analyzed with respect to entropy to determine entropy on a per-portion basis, wherein a file portion may correspond to a configured data size, or block.

At act 530, a determination may be made whether analysis of the second file portion indicates on entropy that is different from an entropy of the analyzed first file portion. At step 530, a function may be applied to an entropy value determined from analyzing the second file portion and entropy value determined from analyzing the first file portion. The function may be a comparison that determines that the entropy of the second file portion exceeds the entropy of the first file portion. The function applied at act 530 may comprise determining that the entropy value corresponding to the second file portion exceeds an entropy value corresponding to the first file portion by a determined or configured amount. The determined or configured amount may be manually configured or may be determined automatically based on results of an artificial intelligence learning model that may have been updated with information or data resulting from previous iterations of acts 520, 525, or 530. If an entropy of the second file portion does not satisfy a criterion, for example, the criterion being that entropy of the second portion exceeds an entropy of the first portion, method 500 returns to act 510 and continues monitoring for a triggering event indication period. If a determination is made at act 530 that an entropy of the second file portions satisfies a criterion, for example that entropy of the second portion exceeds an entropy of the first portion, method 500 advances to act 535 and performs a mitigation or a remediation act before ending at act 540.

It will be appreciated that the first file portion may be the same portion of a given file as the second file portion where in the first file portion refers to the file portion being analyzed before receiving a triggering event indication and the second file portion refers to the same file portion being analyzed after receiving the triggering event indication. In an embodiment, the second file portion may be a portion of a file that has a high entropy value relative to one or more other portions of the same file when analyzed after receiving a triggering event indication. In other words, an entropy corresponding to the first file portion may be compared to an entropy corresponding to an entropy value determined for the same file portion, wherein 'first file portion' and 'second file portion' refer to the same portion of the same file that are analyzed before receiving an indication of a triggering event at step 510 and after receiving an indication of a triggering event, respectively. Or, in an embodiment, an entropy corresponding to the second file portion may be compared to an entropy corresponding to an entropy value determined for a different portion of the same file, wherein 'first file portion' and 'second file portion' refer to different portions of the same file that are both analyzed after receiving an indication of a triggering event at step 510.

Figure 6:
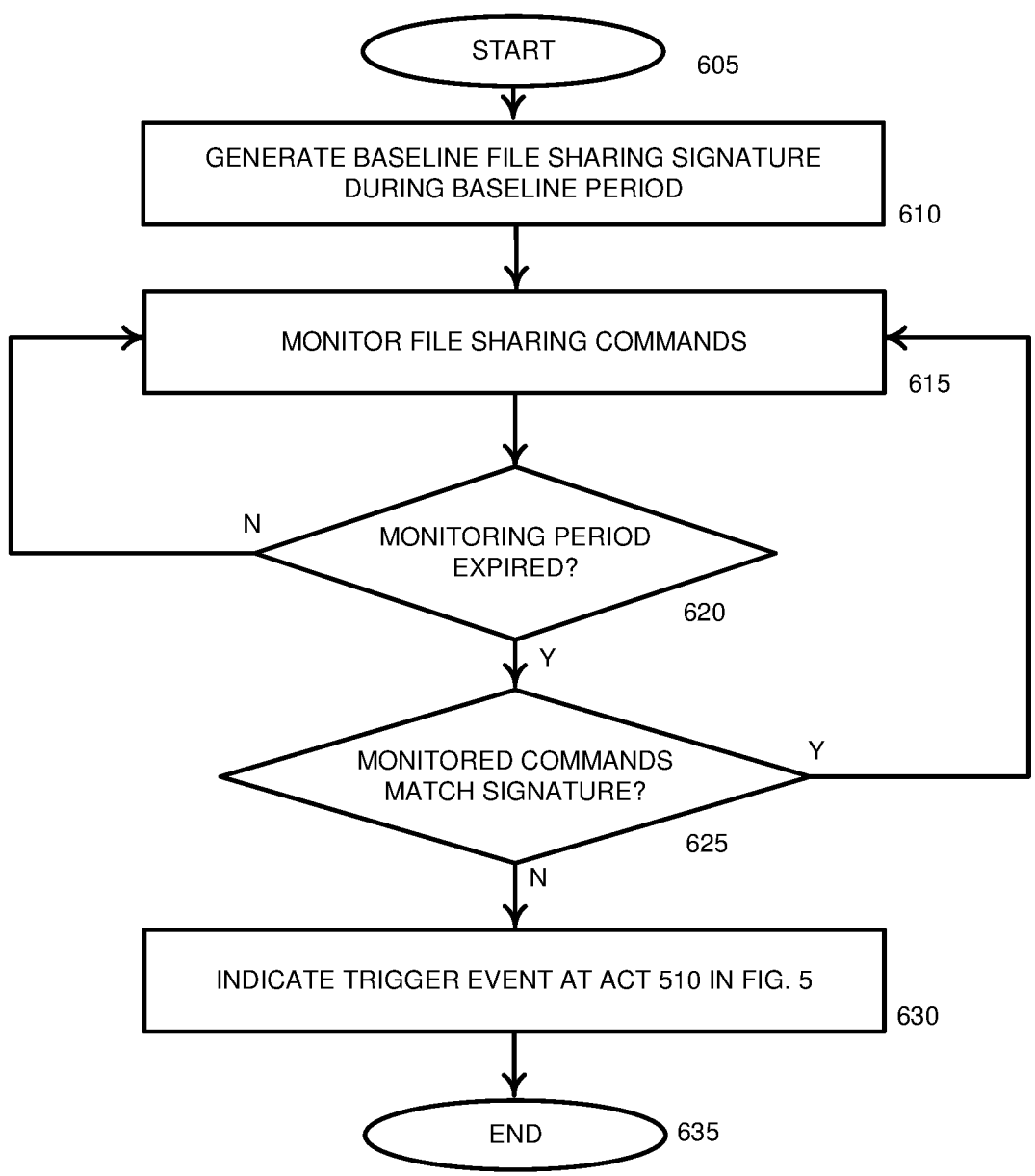
FIG. 6 illustrates a flow diagram of an embodiment to facilitate detection and mitigation of a ransomware attack in a cloud environment.

Turning now to FIG. 6, the figure illustrates a flow diagram of an embodiment to facilitate detection of a ransomware attack in a cloud environment. Method 600 begins at act 605. At act 610, a baseline file sharing signature is generated during a baseline period. The baseline period may comprise a period during which known legitimate file sharing commands are directed to, or performed by, a network connected storage or an associated storage device. For example, during a baseline period a first number of file sharing commands may be directed to, or performed by, the network connected storage or associated device in connection with operations initiated by a legitimate user of the storage. The first number of commands may be a total number of file sharing commands or may be a number of one or more particular commands directed to, or performed, by the network connected storage. In another example, during a baseline period a pattern of file sharing commands may be directed to or performed by the network connected storage or associated storage device. Therefore, a baseline file sharing signature, which may be referred to simply a file sharing signature, may comprise a number of file sharing commands, or a pattern of a number of file sharing commands.

After generating the file sharing signature, method 600 advances to act 615. At act 615, file sharing commands directed to, or performed by, the network connected storage may be monitored during a monitoring period, which may comprise an ongoing moving time period, or window, that continues until a determination at act 620 is made that the monitoring period has run. (It will be appreciated that the 'running' of the monitoring period may comprise ongoing monitoring and storing of data and that as new information is monitored old information may 'drop out' of the monitored information that may be used to determine a number, or pattern, of file sharing commands.) If the monitoring period has not run method 600 returns to act 615. If the monitoring period has run, method 600 advances from act 620 to act 625. At act 625, a determination may be made whether monitored file sharing commands that were monitored during the monitoring period match the file sharing signature that was generated at act 610. If the monitored file sharing commands match the file sharing signature, method 600 returns to act 615. If, however, a determination is made at act 625 that the monitored file sharing commands that were monitored during the monitoring period do not match the file sharing signature generated at act 610, method 600 advances to act 630. At act 630, a triggering event indication may be generated and may be provided to the network connected storage, or to a legitimate user associated with the storage (e.g., an IT personnel authorized to use and administer network 6 shown in FIG. 1) as described above in reference to act 510 of FIG. 5. Method 600 advances to act 635 and ends.

Figure 11:
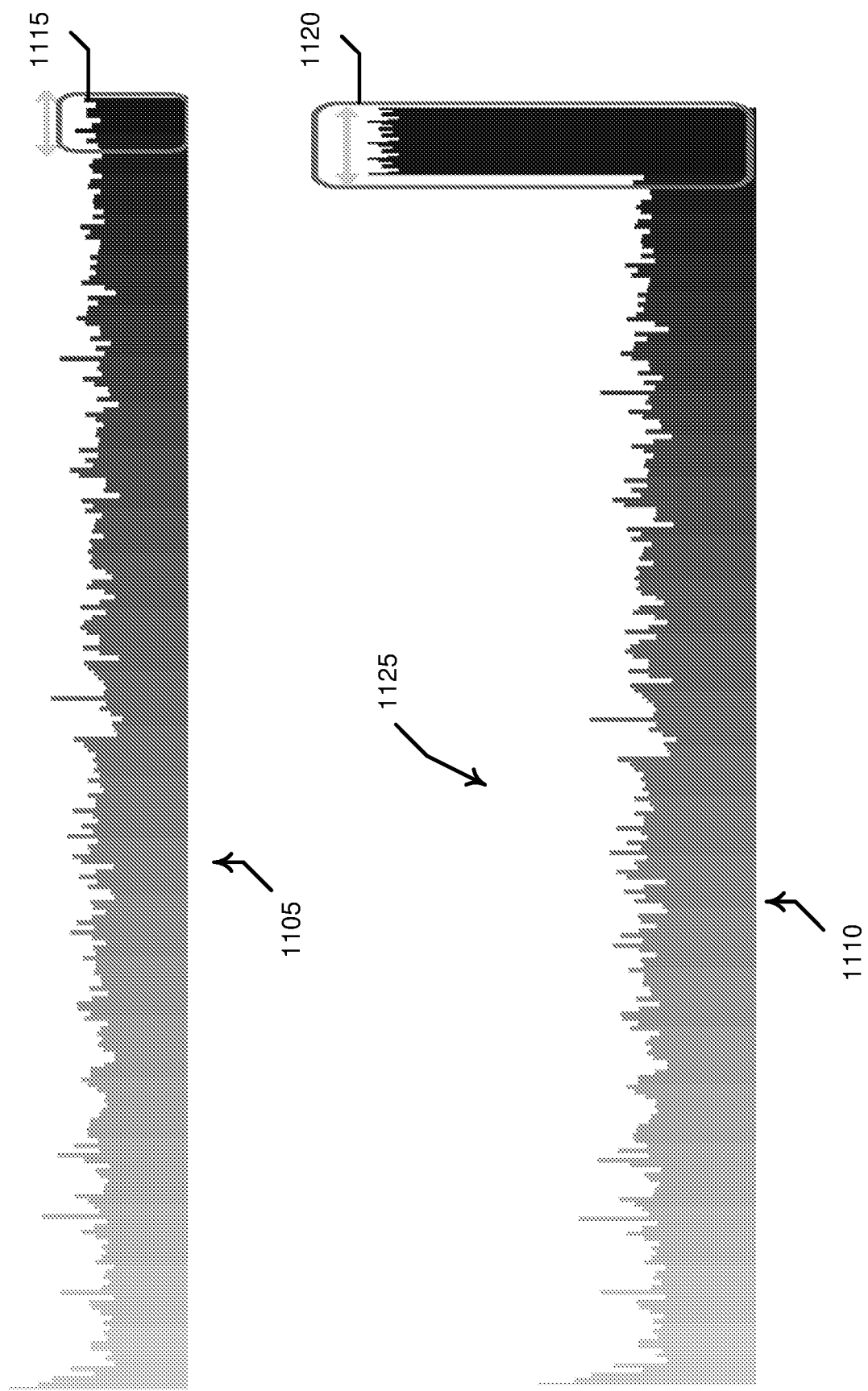
FIG. 11 illustrates a graph of an example file before and after partial encryption.

FIG. 11 illustrates a graphical diagram of a first byte density 1105 of a file before partial encryption and a second byte density 1110 after partial encryption of the file. As shown in the figure, file portion 1115 has a byte density, or entropy, similar to a byte density, or entropy, of other portions of the file. After partial encryption, portion 1120 has a much higher byte density/entropy after portion 1120 has been encrypted, while remaining portions 1125 of the file have the same byte density, or entropy, as before partial encryption. In reference to description to other figures, in an embodiment, portion 1120 may correspond to a second file portion and portion 1125 may correspond to a first file portion. In such a scenario, a file storage device may analyze second file portion 1120 relative to the rest of the file as represented by portion 1125 and determine that the file has been partially encrypted by ransomware because a byte density/entropy of portion 1120 is higher than a byte density/entropy of first portion 1125. Such a determination may be made after a triggering event indication is received by the storage device. In another embodiment as described herein, portion 1120 may correspond to a second file portion and portion 1115 may correspond to a first portion. In such a scenario, a storage device may determine that the file has been partially encrypted by ransomware because second portion 1120 has a higher density, or entropy, than a determination, made before a triggering event, of the entropy of the same portion 1115 of the same file as described elsewhere herein.

Figure 7:
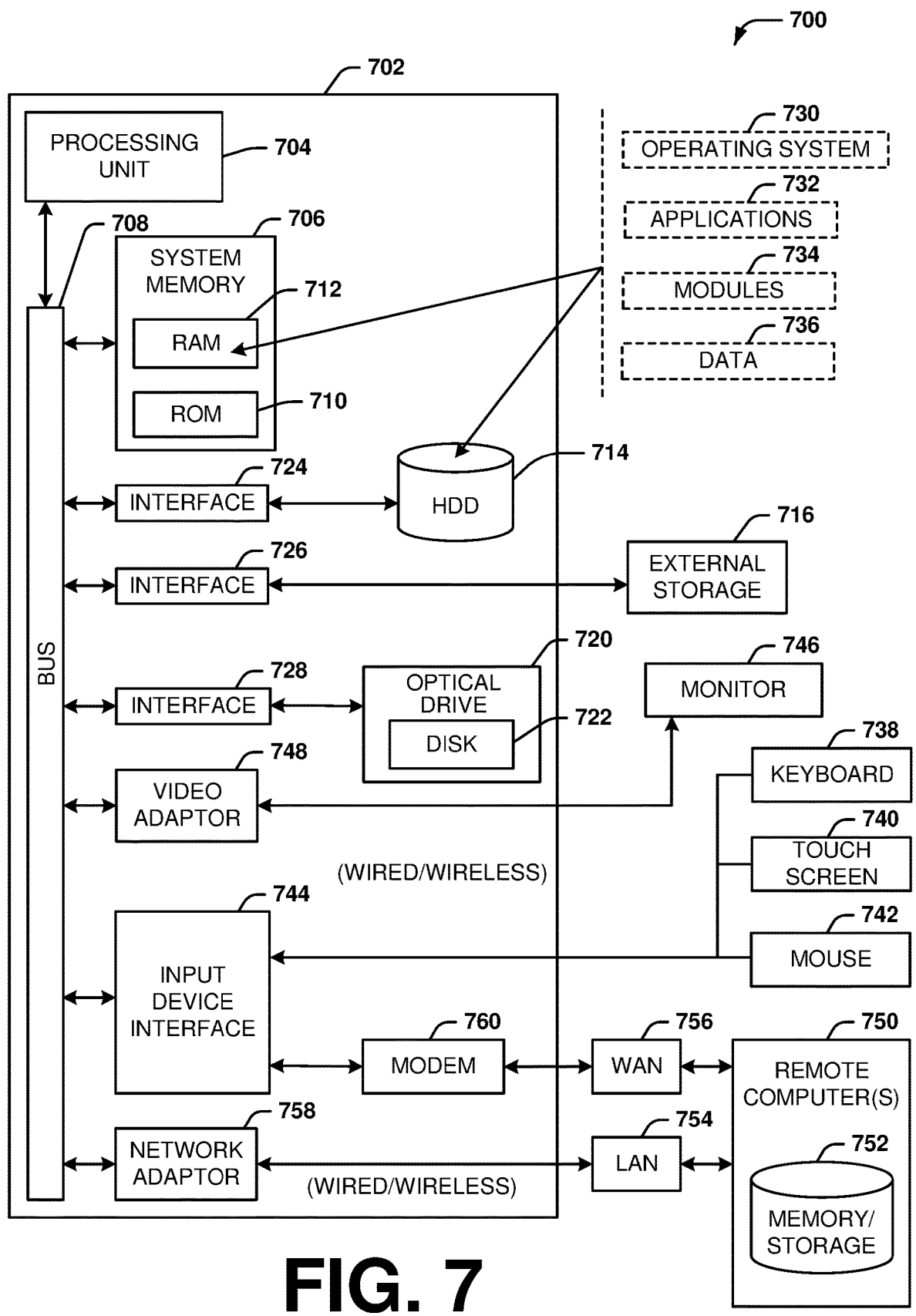
FIG. 7 illustrates a computer environment.

In order to provide additional context for various embodiments described herein, FIG. 7 and the following discussion are intended to provide a brief, general description of a suitable computing environment 700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors and may include a cache memory. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 612 can also include a high-speed RAM such as static RAM for caching data.

Computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and an optical disk drive 720 (e.g., which can read or write from a CD-ROM disc, a DVD, a BD, etc.). While the internal HDD 714 is illustrated as located within the computer 702, the internal HDD 714 can also be configured for external use in a suitable chassis (not shown). Additionally, while not shown in environment 700, a solid-state drive (SSD) could be used in addition to, or in place of, an HDD 714. The HDD 714, external storage device(s) 716 and optical disk drive 720 can be connected to the system bus 708 by an HDD interface 724, an external storage interface 726 and an optical drive interface 728, respectively. The interface 724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can comprise a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1394 serial port, a game port, a USB port, an IR interface, a BLUETOOTH® interface, etc.

A monitor 746 or other type of display device can be also connected to the system bus 608 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 660 or can be connected to a communications server on the WAN 756 via other means for establishing communications over the WAN 756, such as by way of the internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are example and other means of establishing a communications link between the computers can be used.

When used in either a LAN or WAN networking environment, the computer 702 can access cloud storage systems or other network-based storage systems in addition to, or in place of, external storage devices 716 as described above. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Turning now to FIG. 8, the figure illustrates a block diagram of an embodiment method 800. At block 805, the embodiment method 800 comprises: analyzing, by a data storage device that manages a storage on behalf of a computing system, a first portion of at least one file stored in the storage with respect to a file parameter, the analyzing of the first portion resulting in a first analyzed file portion and a first analyzed parameter value; at block 810, responsive to a triggering event indication that indicates a triggering event: analyzing, by the data storage device, a second portion of the at least one file stored in the storage with respect to the file parameter, the analyzing of the second portion resulting in a second analyzed file portion and a second analyzed parameter value; at block 815, determining, by the data storage device, that the second analyzed parameter value exceeds the first analyzed parameter value; at block 820, responsive to the determining that the second analyzed parameter value exceeds the first analyzed parameter value, performing, by the data storage device, a remediation action; at block 825, generating a file sharing signature corresponding to the at least one file stored in the storage of the computing system; at block 830, monitoring, by the data storage device, at least one file sharing command directed to the at least one file stored in the storage; at block 835, determining, by the data storage device, a file sharing activity metric corresponding to the at least one file sharing command; at block 840, determining, by the data storage device, that the file sharing activity metric does not match the file sharing signature; and at block 845, generating, by the data storage device, the triggering event indication based on the file sharing activity metric being determined not to match the file sharing signature.

Figure 9:
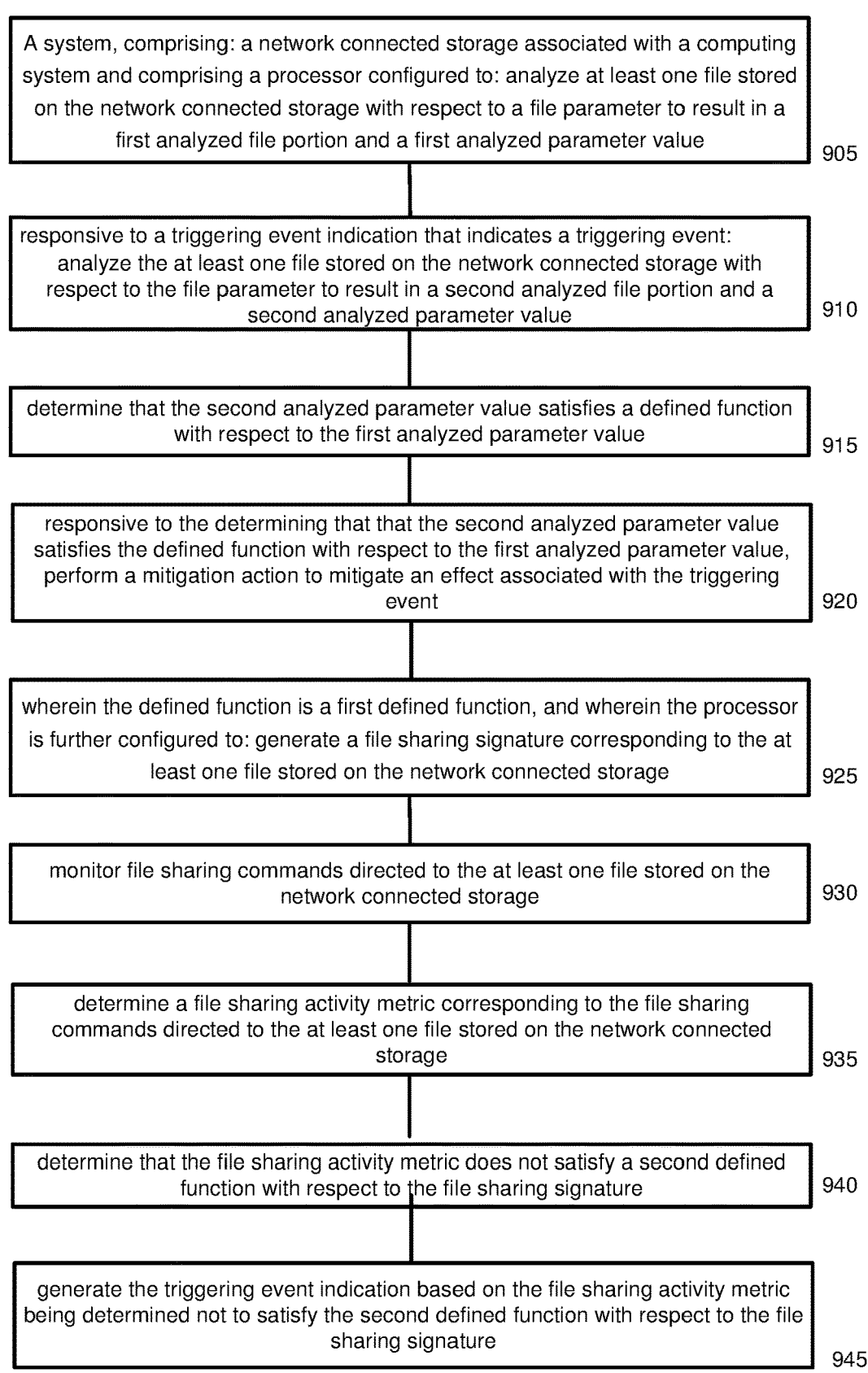
FIG. 9 illustrates an exemplary embodiment system to detect and mitigate ransomware in a cloud environment.

Turning now to FIG. 9, the figure illustrates a block diagram of an embodiment system 900. At block 905, the embodiment system comprises: a network connected storage associated with a computing system and comprising a processor configured to: analyze at least one file stored on the network connected storage with respect to a file parameter to result in a first analyzed file portion and a first analyzed parameter value; at block 910, responsive to a triggering event indication that indicates a triggering event: the processor is configured to analyze the at least one file stored on the network connected storage with respect to the file parameter to result in a second analyzed file portion and a second analyzed parameter value; at block 915, the processor is configured to determine that the second analyzed parameter value satisfies a defined function with respect to the first analyzed parameter value; at block 920, responsive to the determining that that the second analyzed parameter value satisfies the defined function with respect to the first analyzed parameter value, the processor is configured to perform a mitigation action to mitigate an effect associated with the triggering event; at block 925, the defined function is a first defined function, and the processor is further configured to: generate a file sharing signature corresponding to the at least one file stored on the network connected storage; at block 930, the processor is configured to monitor file sharing commands directed to the at least one file stored on the network connected storage; at block 935, the processor is configured to determine a file sharing activity metric corresponding to the file sharing commands directed to the at least one file stored on the network connected storage; at block 940, the processor is configured to determine that the file sharing activity metric does not satisfy a second defined function with respect to the file sharing signature; and at block 945, the processor is configured to generate the triggering event indication based on the file sharing activity metric being determined not to satisfy the second defined function with respect to the file sharing signature.

Figure 10:
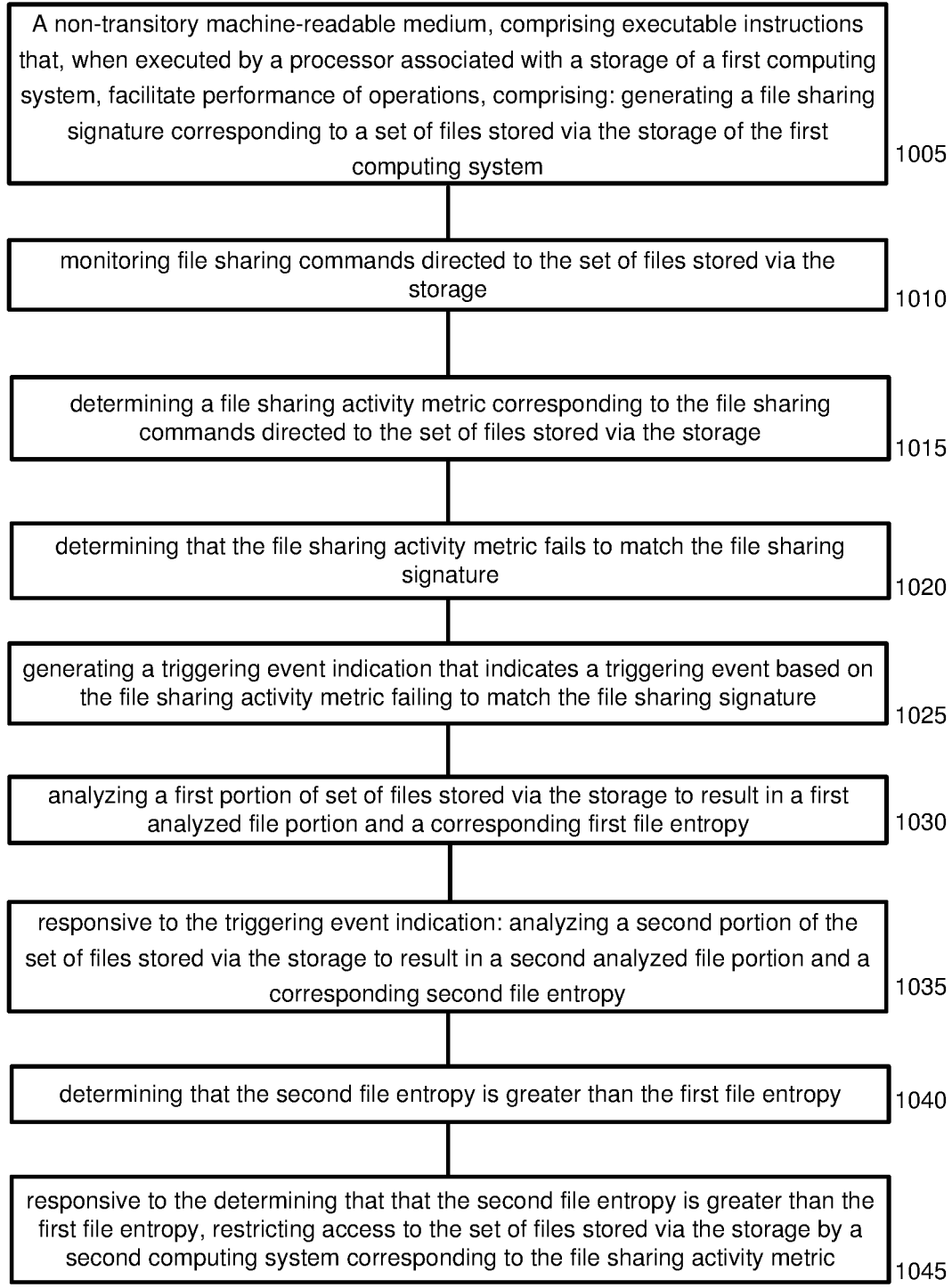
FIG. 10 illustrates an exemplary embodiment non-transitory machine-readable medium, comprising executable instructions.

Turning now to FIG. 10, the figure illustrates an embodiment non-transitory machine-readable medium, comprising executable instructions. At block 1005, the non-transitory machine-readable medium, comprises executable instructions that, when executed by a processor associated with a storage of a first computing system, facilitate performance of operations, comprising: generating a file sharing signature corresponding to a set of files stored via the storage of the first computing system; at block 1010, the operations comprise monitoring file sharing commands directed to the set of files stored via the storage; at block 1015, the operations comprise determining a file sharing activity metric corresponding to the file sharing commands directed to the set of files stored via the storage; at block 1020, the operations comprise determining that the file sharing activity metric fails to match the file sharing signature; at block 1025, the operations comprise generating a triggering event indication that indicates a triggering event based on the file sharing activity metric failing to match the file sharing signature; at block 1030, the operations comprise analyzing a first portion of set of files stored via the storage to result in a first analyzed file portion and a corresponding first file entropy; at block 1035, responsive to the triggering event indication: the operations comprise analyzing a second portion of the set of files stored via the storage to result in a second analyzed file portion and a corresponding second file entropy; at block 1040, the operations comprise determining that the second file entropy is greater than the first file entropy; and at block 1045, responsive to the determining that that the second file entropy is greater than the first file entropy, the operations comprise restricting access to the set of files stored via the storage by a second computing system corresponding to the file sharing activity metric.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

analyzing, by a data storage device that manages a storage on behalf of a computing system, a first portion of at least one file stored in the storage with respect to a file parameter, the analyzing of the first portion resulting in a first analyzed file portion and a first analyzed parameter value; and responsive to a triggering event indication that indicates a triggering event:

analyzing, by the data storage device, a second portion of the at least one file stored in the storage with respect to the file parameter, the analyzing of the second portion resulting in a second analyzed file portion and a second analyzed parameter value;

determining, by the data storage device, that the second analyzed parameter value exceeds the first analyzed parameter value; and responsive to the determining that the second analyzed parameter value exceeds the first analyzed parameter value, performing, by the data storage device, a remediation action, wherein the second portion of the at least one file stored in the storage is a same portion of the at least one file as the first portion of the at least one file stored in the data storage device, wherein the analyzing of the first portion of the at least one file stored in the data storage device comprises analyzing the first portion before the triggering event, and wherein the analyzing of the second portion of the at least one file stored in the data storage device comprises analyzing the second portion after the triggering event, wherein the triggering event comprises determining, by the data storage device, that at least one file sharing command directed to or from the data storage device corresponds to violation of at least one file sharing command criterion, wherein the at least one file sharing criterion comprise a configured number of at least one connect command, directed to the data storage device after at least one of: at least one read command directed to the data storage device, at least one write command directed to the data storage device, or at least one remove command directed to the data storage device, and wherein the triggering event indication is indicative of a determined number of at least one connect command directed to the data storage device after at least one of: at least one read command directed to the data storage device, at least one write command directed to the data storage device, or at least one remove command directed to the data storage device, being equal to, or exceeding, the configured number of at least one connect command.

2. The method of claim 1, wherein the file parameter comprises entropy.

3. The method of claim 1, further comprising dividing, by the data storage device, the second analyzed parameter value by the first analyzed parameter value to result in a parameter value ratio, wherein the determining that the second analyzed parameter value exceeds the first analyzed parameter value comprises determining that the parameter value ratio exceeds a threshold ratio specified by a configured attack criterion.

4. The method of claim 3, wherein the threshold ratio specified by the configured attack criterion is a ratio of one to one.

5. The method of claim 1, further comprising:

generating a file sharing signature corresponding to the at least one file stored in the storage of the computing system, wherein the at least one file sharing command criterion comprises the file sharing signature;

monitoring, by the data storage device, the at least one file sharing command;

determining, by the data storage device, a file sharing activity metric corresponding to the at least one file sharing command;

determining, by the data storage device, that the file sharing activity metric does not match the file sharing signature; and generating, by the data storage device, the triggering event indication based on the file sharing activity metric being determined not to match the file sharing signature.

6. The method of claim 5, wherein the file sharing signature comprises first information representative of a baseline number of executions of the at least one file sharing command performed with respect to the at least one file during a baseline period, wherein the file sharing activity metric comprises second information representative of a monitored number of executions of the at least one file sharing command performed with respect to the at least one file during a monitoring period, and wherein the determining that the file sharing activity metric does not match the file sharing signature comprises determining that the monitored number of executions of the at least one file sharing command exceeds, by a threshold value specified by a configured file sharing activity criterion, the baseline number of executions.

7. The method of claim 5, wherein the computing system is a first computing system, and wherein the remediation action comprises generating a notification that identifies a second computing system corresponding to the file sharing activity metric.

8. The method of claim 7, further comprising blocking, by the data storage device, access by the second computing system to the first computing system.

9. The method of claim 1, wherein the second portion of the at least one file stored in the data storage device or the first portion of the at least one file stored on the data storage device comprises less than all of the at least one file.

10. A system, comprising:

a network connected storage associated with a computing system and comprising a processor configured to:

analyze at least one file stored on the network connected storage with respect to a file parameter to result in a first analyzed file portion and a first analyzed parameter value; and responsive to a triggering event indication that indicates a triggering event:

analyze the at least one file stored on the network connected storage with respect to the file parameter to result in a second analyzed file portion and a second analyzed parameter value;

determine that the second analyzed parameter value satisfies a defined function with respect to the first analyzed parameter value; and responsive to the determining that that the second analyzed parameter value satisfies the defined function with respect to the first analyzed parameter value, perform a mitigation action to mitigate an effect associated with the triggering event,
wherein the first analyzed file portion results from analyzing the at least one file before the triggering event, wherein the second analyzed file portion results from analyzing the at least one file after the triggering event, wherein the triggering event comprises determining, by the data storage device, that at least one file sharing command directed to or from the data storage device corresponds to violation of at least one file sharing command criterion, wherein the at least one file sharing criterion comprise a configured number of at least one connect command, directed to the network connected storage after at least one of: at least one read command directed to the network connected storage, at least one write command directed to the network connected storage, or at least one remove command directed to the network connected storage, and wherein the triggering event indication is indicative of a determined number of at least one connect command directed to the network connected storage after at least one of: at least one read command directed to the network connected storage, at least one write command directed to the network connected storage, or at least one remove command directed to the network connected storage, being equal to, or exceeding, the configured number of at least one connect command.

11. The system of claim 10, wherein the defined function is a first defined function, and wherein the processor is further configured to:
generate a file sharing signature corresponding to the at least one file stored on the network connected storage;
monitor file sharing commands directed to the at least one file stored on the network connected storage;
determine a file sharing activity metric corresponding to the file sharing commands directed to the at least one file stored on the network connected storage;
determine that the file sharing activity metric does not satisfy a second defined function with respect to the file sharing signature; and
generate the triggering event indication based on the file sharing activity metric being determined not to satisfy the second defined function with respect to the file sharing signature.

12. The system of claim 11, wherein the file sharing signature comprises a baseline number of executions of an at least one file sharing command performed with respect to the at least one file during a baseline period, wherein the file sharing activity metric comprises a monitored number of executions of the at least one file sharing command performed with respect to the at least one file during a monitoring period, wherein the second defined function is defined according to a configured file sharing activity criterion, and wherein the file sharing activity metric being determined not to satisfy the second defined function with respect to the file sharing signature comprises determining that the monitored number of executions does not satisfy the second defined function with respect to the baseline number of executions.

13. The system of claim 10, wherein the second analyzed file portion of the at least one file corresponds to a same portion of the at least one file as the first analyzed file portion of the at least one file.

14. The system of claim 10, wherein the at least one file is at least two files, wherein the second analyzed file portion of the at least two files stored on the network connected storage or the first analyzed file portion of the at least two files stored on the network connected storage comprises less than all of the at least two files stored on the network connected storage.

15. A non-transitory machine-readable medium, comprising executable instructions that, when executed by a processor associated with a storage of a first computing system, facilitate performance of operations, comprising:
generating a file sharing signature corresponding to a set of files stored via the storage of the first computing system;
after the generating of the file sharing signature, monitoring file sharing commands directed to the set of files stored via the storage;
determining a file sharing activity metric corresponding to the file sharing commands directed to the set of files stored via the storage;
determining that the file sharing activity metric fails to match the file sharing signature;
generating a triggering event indication that indicates a triggering event based on the file sharing activity metric failing to match the file sharing signature;
before the triggering event, analyzing a first portion of a set of files stored via the storage to result in a first analyzed file portion and a corresponding first file entropy; and
responsive to the triggering event indication:
analyzing a second portion of the set of files stored via the storage to result in a second analyzed file portion and a corresponding second file entropy;
determining that the second file entropy is greater than the first file entropy; and
responsive to the determining that that the second file entropy is greater than the first file entropy, restricting access to the set of files stored via the storage by a second computing system corresponding to the file sharing activity metric,
wherein at least one file sharing criterion comprise a configured number of at least one connect command, directed to the storage after at least one of: at least one read command directed to the storage, at least one write command directed to the storage, or at least one remove command directed to the storage, and wherein the triggering event indication is indicative of a determined number of at least one connect command directed to the storage after at least one of: at least one read command directed to the storage, at least one write command directed to the storage, or at least one remove command directed to the storage, being equal to, or exceeding, the configured number of at least one connect command.

16. The non-transitory machine-readable medium of claim 15, wherein the file sharing commands directed to the set of files stored via the storage comprise server message block commands.

17. The non-transitory machine-readable medium of claim 15, wherein the file sharing signature comprises a baseline number of executions of a set of file sharing commands performed with respect to the set of files during a baseline period, wherein the file sharing activity metric comprises a monitored number of executions of the set of file sharing commands performed with respect to the set of files during a monitoring period, and wherein the determining that the file sharing activity metric fails to match the file sharing signature comprises determining that the monitored number of executions is greater than the baseline number of executions determined with reference to a configured file sharing activity criterion.

18. The non-transitory machine-readable medium of claim 15, wherein the second portion of the set of files stored via the storage is a same portion as the first portion of the set of files stored via the storage, wherein the first portion of the set of files stored via the storage is analyzed before the triggering event, wherein the second portion of the set of files stored via the storage is analyzed after the triggering event, and wherein the second portion of the set of files stored via the storage or the first portion of the set of files stored via the storage comprises at most some of the set of files stored via the storage.

19. The non-transitory machine-readable medium of claim 15, wherein the second portion of the set of files stored via the storage comprises a higher data density than the second portion of the set of files stored via the storage.

20. The method of claim 1, wherein the at least one file sharing command comprises at least one server message block command.

\* \* \* \* \*